July 14, 1970

R. C. HANSEN 3,520,445

DIELECTRIC LEVEL SENSOR

Filed Feb. 13, 1968

INVENTOR.
RUSSELL C. HANSEN

BY *August E. Rocking*
*Ronald Zibell*
ATTORNEYS

July 14, 1970
R. C. HANSEN
3,520,445
DIELECTRIC LEVEL SENSOR
Filed Feb. 13, 1968
4 Sheets-Sheet 2
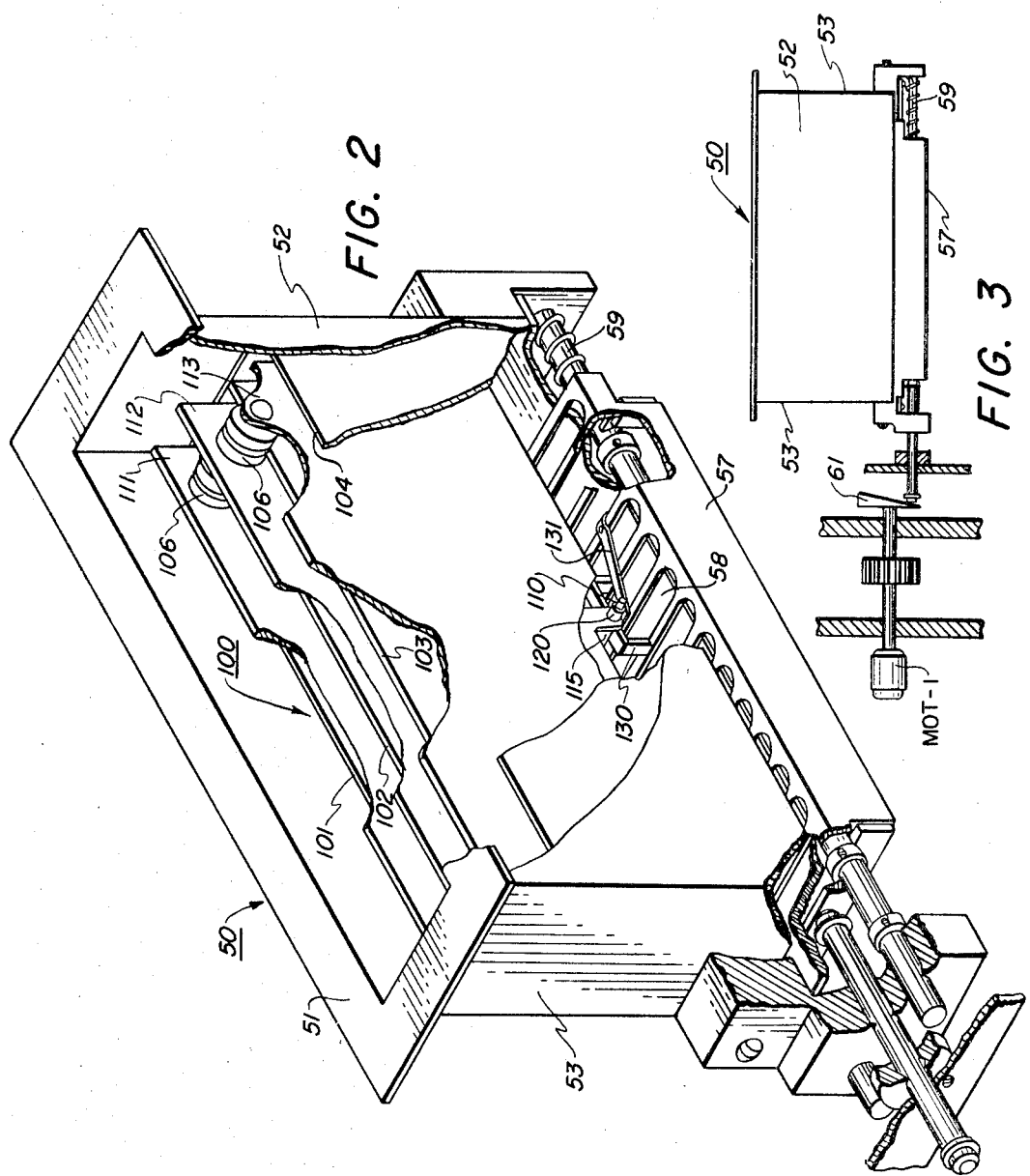
INVENTOR.
RUSSELL C. HANSEN
BY
*Ronald Zibell*
ATTORNEYS

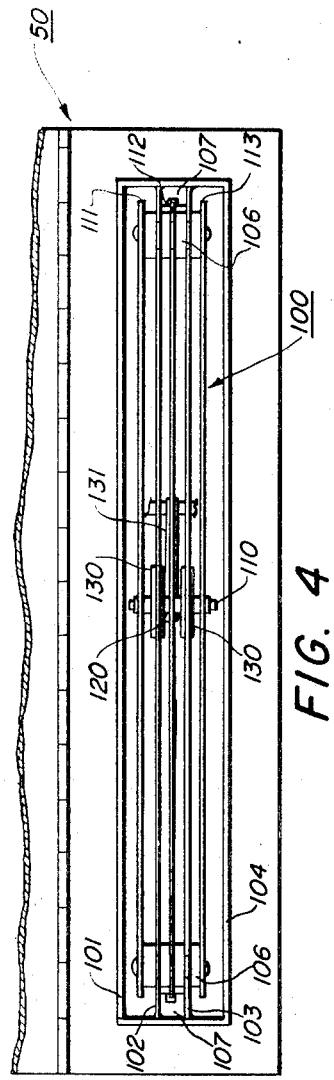
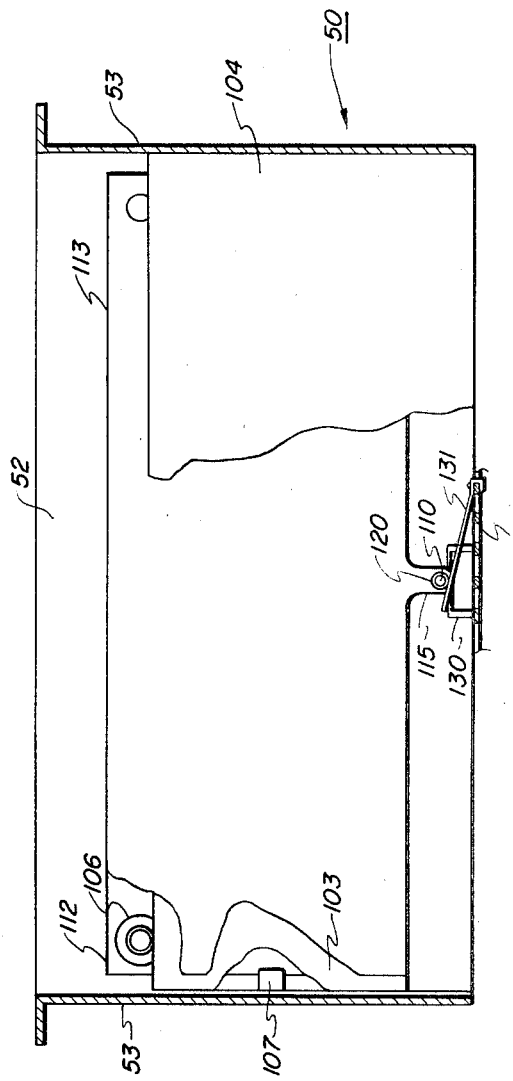

United States Patent Office 3,520,445
Patented July 14, 1970

3,520,445
DIELECTRIC LEVEL SENSOR
Russell C. Hansen, Lakeville, Conn., assignor to Xerox Corporation, Rochester, N.Y., a corporation of New York
Filed Feb. 13, 1968, Ser. No. 705,153
Int. Cl. B67d 5/38
U.S. Cl. 222—23
3 Claims

ABSTRACT OF THE DISCLOSURE

A level sensing controller for determining the quantity of xerographic toner powder in the toner powder dispenser of an automatic xerographic reproducing machine wherein a plurality of electrically conductive plates are suspended within the dispenser cavity in spaced relation and connected to a threshold detecting circuit for activating a suitable indicator when the quantity of toner powder contained within the dispensing cavity is below a level predetermined for optimum machine operation.

BACKGROUND OF THE INVENTION

This invention relates to level sensing apparatus and in particular to a control circuit and apparatus for indicating the presence of material in a granular material dispenser.

More specifically, this invention relates to a control circuit and apparatus for determining the presence of electroscopic toner powder in the retaining chamber of a toner-powder dispenser utilized in an automatic xerographic reproducing machine.

In the process of xerography, a xerographic plate having a layer of photoconductive material on a conductive backing is given a uniform electrostatic charge over its surface and then exposed to the subject matter to be reproduced by various projection techniques. This exposure discharges the plate in accordance with the light intensity reaching it, thereby, creating a latent electrostatic image on or in the plate.

Development of the image is effected by developers which comprise, in general, a mixture of suitable pigmented or dyed resin-based powder, hereinafter referred to as toner, and a granular carrier material which functions to generate triboelectric charges on, and to carry the toner. More specifically, the function of the carrier material is to provide mechanical control of the toner or to carry the toner to an image surface and simultaneously, provide almost complete homogeneity of charge polarity. In the development of the image, the toner powder is brought into surface contact with the photoconductive coating and is held thereon electrostatically in a pattern corresponding to the latent electrostatic image. Thereafter, the developed xerographic image may be transferred to a support material to which it may be fixed by any suitable means such as heat fusing.

In the mixture of toner particles and carrier material, the toner particles which are many times smaller than the carrier material, adhere to and coat the surface of the carrier material due to the triboelectric attraction therebetween. During development, as the toner-coated carrier material rolls or tumbles over the xerographic plate carrying an electrostatic image of opposite polarity to the charge of the toner, toner particles are pulled away from the carrier by the latent electrostatic image and deposited on the plate to form a developed toner-powder image. As toner-powder images are formed, additional toner powder must be supplied to the developer mixture to replenish the toner deposited on the xerographic plate. The toner material may be of the type disclosed in Carlson Pat. No. 2,940,934, wherein the toner particles comprise a finely divided pigmented resin having a particle size less than 20 microns and preferably an average particle size between about 5 and 10 microns and comprising a finely divided uniform mixture of pigment in a non-tacky, low-melting resin. Desirably, the pigment will be a black pigment such as carbon black or other minutely divided carbonacious pigment.

As the toner powder in the developer mixture is depleted during the development of the latent image on the xerographic plate, more toner powder must be added to prevent faint copies having low contrast. A suitable apparatus for dispensing toner powder into the developer mixture is disclosed in R. A. Hunt, U.S. Pat. No. 3,013,703, issued Dec. 19, 1961, and reference is made thereto for the details of the dispensing apparatus disclosed therein.

As toner powder is dispensed from the dispensing apparatus in metered quantities, the quantity contained therein gradually becomes depleted. In the operation of high speed, high volume automatic xerographic reproducing machines, it is desirable to have means for indicating when the supply of toner powder in the dispensing apparatus has become nearly depleted so that an operator may add more powder to obtain optimum quality of xerographic reproductions. Heretofore this determination of the quantity of toner powder in the dispensing apparatus was accomplished by means of an indicator rod which was lowered by the machine operator into the developer material to indicate the quantity remaining therein by the operator visually noting the quantity of toner powder remaining by graduations on the rod. The disadvantage of handling toner material in this manner is the tendency of the toner powder, due to its minute size, to become air borne when the dispenser is opened by the machine operator. This airborne toner powder contaminates the surrounding area with carbon black particles, blackening the operator's hands and clothing, creating an undesirable working condition. In addition, due to the toner powders' affinity for triboelectrification, the toner powder handled in this manner has a tendency to become electrostatically attracted to various apparatus having a small charge of opposite polarity and, therefore, a system for determining the level of the toner powder in the xerographic toner powder dispenser must be free from the effects of triboelectrification.

The present invention comprises a new method and apparatus for determining the level of electroscopic toner powder in the retaining chamber of a xerographic toner powder dispenser.

SUMMARY OF THE INVENTION

It is, therefore, an object of this invention to improve level sensing apparatus.

Another object of this invention is to improve level sensing apparatus for determining the presence of electroscopic xerographic toner powder.

A further object of this invention is to improve level sensing apparatus for use in xerographic toner-powder dispensers by automatically sensing the level of the toner powder contained therein without manual contact with the dispensing apparatus.

Still another object of this invention is to improve level sensing apparatus for use in a xerographic toner-powder dispenser by sensing the level of electroscopic toner powders contained therein by means of an apparatus independent of machine operation.

These and other objects are obtained in accordance with the present invention wherein there is provided a xerographic toner-powder level sensor including a plurality of electrically conductive plates suspended within a dispenser cavity in spaced relation to allow toner powder to repose therebetween forming a variable capacity electrical charge storage element the capacitance level of which varies as the electroscopic toner powder supply is depleted by normal dispensing operation. The change in capacitance is coupled to a bridge circuit whereby the change in capacitance due to depletion of the toner supply will be converted to a voltage change and coupled to a transistorized silicon controlled switch circuit for activating a suitable indicator when it is determined that the level of toner powder in the xerographic toner-powder dispenser has depleted beyond a certain minimal quantity.

DESCRIPTION OF THE DRAWINGS

Further objects of this invention, together with additional features contributing thereto and advantages accruing therefrom, will be apparent from the following description of one embodiment of the invention when read in conjunction with the accompanying drawings, wherein:

FIG. 2 is an enlarged perspective view of the toner dispensing apparatus utilized in the automatic xerographic reproducing machine illustrated in FIG. 1;

FIG. 3 is a schematic representation of the toner powder dispensing apparatus to better illustrate the drive mechanism therefor;

FIG. 4 is a partial top horizontal view of the toner dispensing apparatus shown in FIG. 2 to better illustrate the level sensing apparatus;

FIG. 5 is a front vertical view of the apparatus of FIG. 4 with parts broken away to better illustrate the construction thereof.

DESCRIPTION OF THE PREFERRED EMBODIMENT

Figure 1:
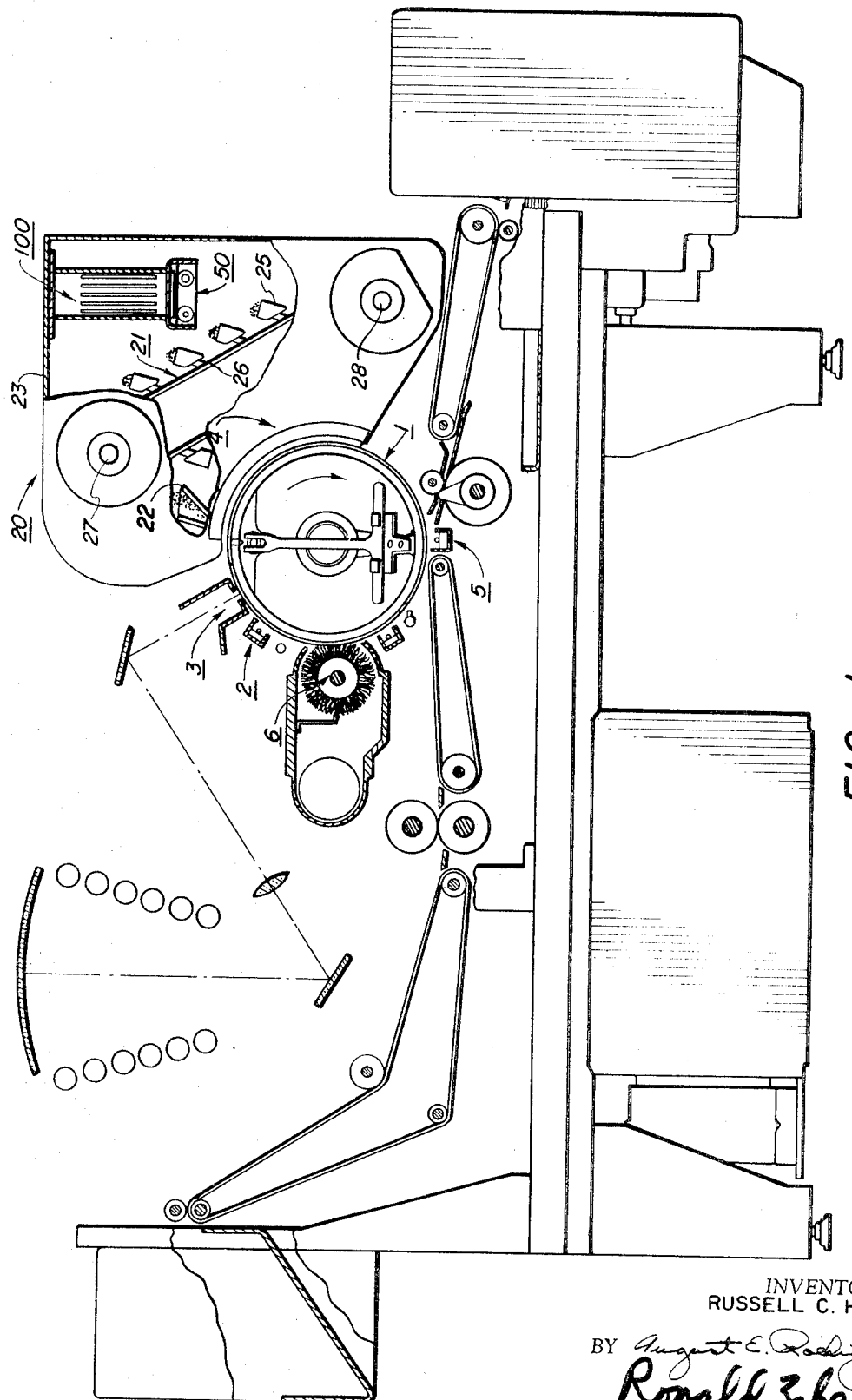
FIG. 1 is a schematic illustration of an automatic xerographic reproducing apparatus utilizing the invention.

Referring now to FIG. 1, there is shown an embodiment of the subject invention in a suitable environment such as an automatic xerographic reproducing machine, although it should be noted that the invention is not intended to be limited thereto.

The automatic xerographic reproducing machine includes a xerographic plate 1 including a photoconductive layer or light receiving surface on a conductive backing journaled in a frame to rotate in the direction indicated by the arrow to cause the plate surface to sequentially pass a series of xerographic processing stations.

For the purposes of the present disclosure, the several xerographic processing stations in the path of movement of the plate surface may be described functionally as follows:

A charging station 2 at which a uniform electrostatic charge is deposited on or in the photoconductive plate;

An exposure station 3 at which a light or radiation pattern of copy to be reproduced is projected onto the plate surface to dissipate the charge in the exposed areas thereof to thereby form a latent electrostatic image of the copy to be reproduced;

A developing station 4 at which the xerographic developing material, including toner particles having an electrostatic charge opposite to that of the latent electrostatic image, is cascaded over the plate surface whereby the toner particles adhere to the latent electrostatic image to form a toner-powder image in configuration of the copy being reproduced;

A transfer station 5 at which the toner-powder image is electrostatically transferred from the plate surface to a transfer material or a support surface; and A drum cleaning and discharge station 6 at which the plate surface is brushed to remove residual toner particles remaining thereon after image transfer, and exposed to a relatively bright light source to effect substantially complete discharge of any residual electrostatic charge remaining thereon or therein.

The developing station 4 which effects development of the latent electrostatic image of the cylindrical xerographic plate, comprises a developer apparatus 20 which coacts with the cylindrical plate to develop the latent electrostatic image on or in the plate surface by means of the xerographic toner-powder. Mounted within the developer housing is a driven bucket-type conveyor 21 used to carry the developer material previously supplied to the developer housing to the upper portion of the developer housing from which point the developer material is cascaded over the hopper chute 22 onto the drum. As the developer material cascades over the drum, toner particles of the developer material adhere electrostatically to the previously formed latent electrostatic image areas on the drum, the remaining developer material falling off the peripheral surface of the drum to be deflected by suitable baffle plates into the bottom or sump portion of the developer housing. Toner particles consumed during the developing operation to form the visible powder images are replenished by a toner dispenser 50 mounted within the developer housing.

The bucket-type conveyor 21 is used to convey the developer material from the sump portion to the upper portion of the developer housing from where it is cascaded over the xerographic drum. As shown, the conveyor 21 includes a series of parallel spaced buckets 25 secured to a suitable pair of conveyor belts 26 passing around a conveyor drive pulley 27 and a conveyor idler pulley 28 secured on drive and idler shafts to rotate therewith, and powered by a suitable motor. For further details concerning the specific construction for a suitable developer apparatus reference is made to W. G. Lewis et al., U.S. Pat. No. 3,067,720.

As the developing mixture is cascaded over the xerographic drum, toner particles are pulled away from the carrier and deposited on the drum to form toner-powder images, while the partially denuded carrier particles pass off the drum into the sump portion of the developer housing. As toner powder images are formed, additional toner particles must be supplied to the developing mixture in proportion to the amount of toner deposited on the drum. To supply additional toner particles to the developing mixture, the toner dispenser 50 is used to accurately meter toner to the developer mixture. Although any one of a number of well-known powder or granular material dispensers may be used, the toner dispenser shown is of the type disclosed in U.S. Pat. No. 3,013,703, issued Dec. 19, 1961, to R. A. Hunt.

The toner dispenser 50 comprises a hopper or container 51 for the xerographic toner particles to be dispensed. Although the hopper or container 51 may be made in any size or shape, the hopper shown is formed as a rectangular open ended box having vertical side and end walls, 52 and 53 respectively, the upper ends of the walls being bent outward to form horizontal flanges by means of which the hopper may be attached to the underside of top wall 23 of the developer housing, as by welding, with the opening and top wall 23 of the developer housing in alignment with the opening in the hopper. At opposite ends of the hopper are positioned depending bearing blocks for supporting the remaining elements of the toner dispenser, the bearing blocks being appropriately attached to the end walls.

The bottom of the hopper is partially closed by a dispensing plate 57 positioned and spaced in vertical relation below the lower edges of the walls of the hopper which combines with the walls of the hopper 51 to provide a reservoir having narrow elongated outlet slits or passages 58 for the flow of xerographic toner powder. In the operation of the toner dispenser a supply of toner powder is placed within the hopper, the hopper walls and the dispensing plate forming a reservoir for the toner particles. Upon reciprocation of the dispensing plate as by motor MOT-1 driving cam 61 to effect axial motion of the spring biased plunger rod 59, a metered quantity of toner powder will be permitted to pass through the plate 57, where the powder will fall to the reservoir portion of the developer housing.

Since the toner dispenser 50 dispenses a uniform quantity of toner for a given stroke of the dispensing plate, it is apparent that the quantity of toner delivered by the toner dispenser may be altered by varying the number of strokes per unit of time. Reciprocation of the dispensing plate is effected by means of the cam 61 secured to the end of the motor shaft coacting with the spring biased plunger rod 59 operatively connected to the dispensing plate 57.

It is felt that the preceding description of the toner dispenser 50 is sufficient for a better understanding of the subject matter of this invention. For further details relative to the specific construction of this dispensing apparatus, reference is made to the aforementioned Hunt patent.

Figure 6:
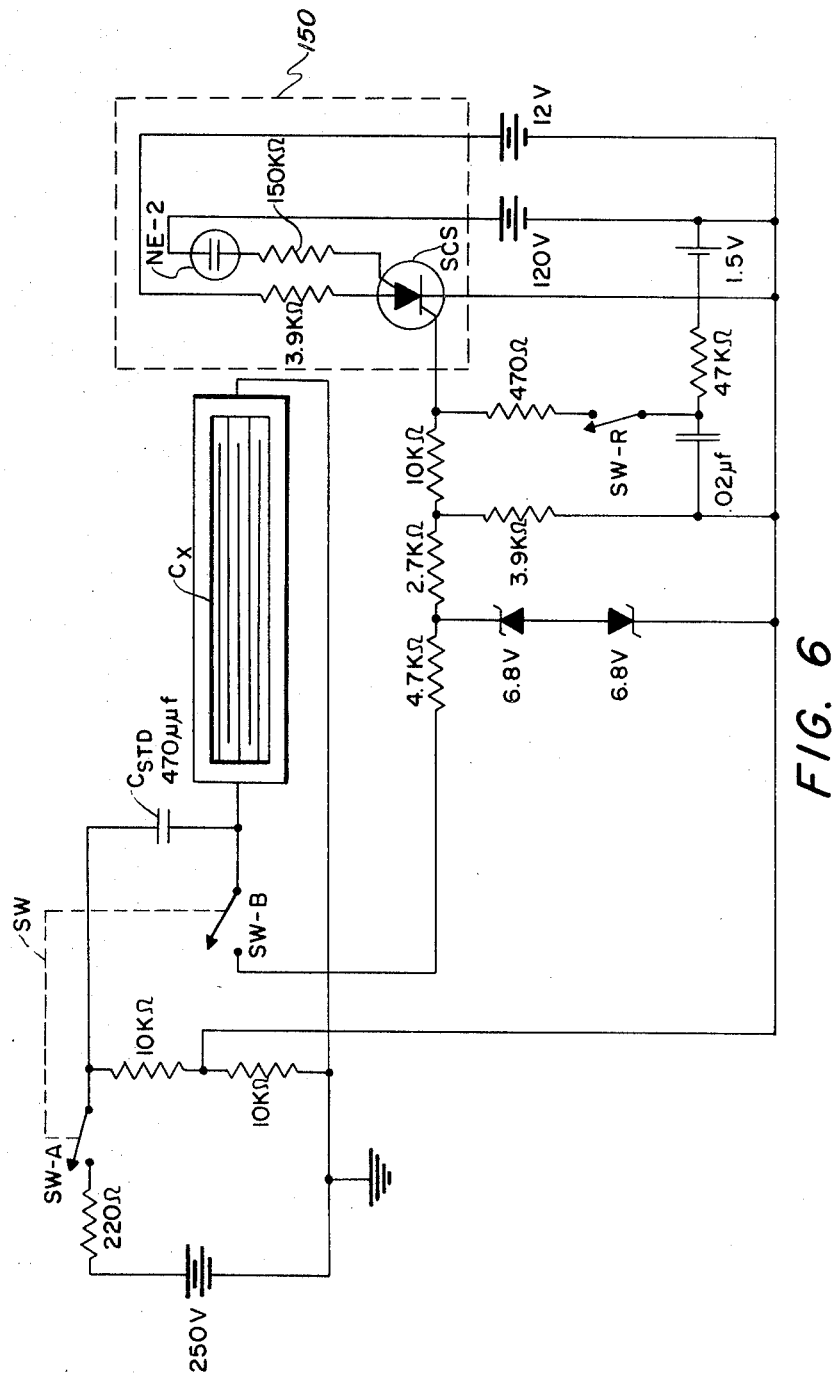
FIG. 6 is an electrical schematic of the xerographic toner powder level sensing device.

In order to determine the level of the xerographic toner powder contained in the toner dispenser 50, there is shown in FIG. 6 an electrical schematic diagram of an automatic level control system which ultimately energizes a suitable indicator in accordance with the level of the electroscopic xerographic toner-powder contained in the toner dispenser cavity formed by the side and end walls, lid 54 and toner powder.

As best shown in FIGS. 2, 3, and 5, the sensor 100 includes a series of parallel electrically conductive plates 101, 102, 103, and 104 suitably secured to the end walls 53 of the toner powder dispenser and electrically grounded thereby. A similar series of parallel electrically conductive plates 111, 112, and 113 are positioned between grounded plates 101, 102, 103, and 104 (FIG. 4) and supported therefrom by means of insulators 106, the plates 111, 112, and 113 being insulated from the grounded plates by the insulators 106 and insulator guides 107 and electrically coupled together by means of an electrically conductive rod 110 passing in contact with each of the plates 111, 112, and 113 and connected into the electrical circuit shown schematically in FIG. 6.

The lowermost ends of plates 111, 112, and 113 are each formed with an extension 115 (FIG. 5) having an aperture therein to support the conductive rod 110 for electrically coupling the plates. A pair of insulator sleeves 120 are supported on the rod 110 to engage a stop 130, secured to the dispensing plate 57 of the toner dispenser 50, and to insulate the plates 111, 112, and 113 therefrom.

Due to the electroscopic nature of the toner powder, occasional spanning of adjacent parallel plates by the toner might occur as the supply within the dispenser chamber is depleted. This spanning of adjacent plates, or "bridging" would affect the capacitance of the sensor assembly and thereby effecting erroneous output from the system. To prevent this spanning, a ramp 131 is secured to the dispensing plate 57 for movement therewith and positioned thereon such that the ramp engages one of the insulator sleeves 120 to reciprocate the plates 111, 112, and 113 up and down causing the plates to be elevated and then lowered to impact with the stop 130 thereby collapsing any toner powder "bridges" that might span between adjacent plates and thereby preventing an erroneous response in the detecting circuit.

The sensor apparatus heretofore described, is connected into an electrical circuit shown schematically in FIG 6. The variable capacitance sensor 100 is connected into a conventional Wheatstone bridge circuit such that the sensor's capacitance ($C_x$) is compared to a fixed standard $C_{STD}$ whereby a variable voltage output is developed from the bridge circuit as the electroscopic toner powder is depleted from the dispenser 50. This voltage output from the bridge is coupled to a transistorized silicon controlled switch circuit 150 to actuate a suitable indicator, such as a neon lamp NE–2, when the toner powder has become sufficiently depleted, indicated by the unbalanced bridge condition ($C_{STD} > C_x$) generating a sufficiently high voltage to allow the silicon controlled switch SCS to conduct illuminating the indicator lamp NE–2 to notify the machine operator of a depleting toner powder supply in the dispenser chamber.

In operation, the variable capacitance sensor 100 has a capacitance C when the parallel plates 101–104 and 111–113 have no toner powder therebetween and the dielectric material is air. This capacitance is increased when toner powder, having a higher dielectric constant, is present between the plates increasing the capacitance C by a value $\Delta C$ which is a function of the amount of toner reposing between the parallel plates. The capacitance of the sensor $C + \Delta C = C_x$ is determined for a point indicative of a toner powder level predetermined to be representative of the minimum level of toner powder contained within the dispenser for continued optimum machine operation. The capacitance of the sensor assembly at the predetermined toner powder level ($C + C_{op}$) is placed in the bridge circuit and compared with a standard capacitor ($C_{STD}$). One leg of the bridge is coupled to the input gate of the silicon controlled switch SCS, and the other leg is coupled to the cathode through a plurality of resistors to control the conduction of the SCS in response to the unbalance of the bridge circuit caused by the depletion of the toner powder below the predetermined level ($C_{STD} > C + C_{op}$). A pair of Zener diodes are coupled between the legs of the bridge at the input to the SCS to protect the SCS from high voltage transient signals from the output of the bridge when the contacts SW–A and SW–B of switch SW are closed.

The switch contacts SW–A and SW–B are the contacts of a single throw double pole switch SW and are ganged to allow the contacts of SW–A to be closed a few milliseconds before the contacts SW–B are closed. When the machine operator is not testing the toner powder level within the dispenser, the contacts SW–A are open. When the machine operator desires to test the level of the toner powder, the switch SW is actuated closing contacts SW–A charging capacitor $C_{STD}$ and $C_x$ to their steady state. Subsequently the contacts SW–B are closed coupling the output of the bridge circuit therefrom to the silicon controlled switch SCS. If the capacitance of the sensor assembly $C_x$ is below the predetermined level ($C + C_{op}$), a positive triggering voltage pulse will be produced allowing the silicon controlled switch SCS to conduct illuminating the neon lamp NE–2 and thereby signalling the need for toner powder replenishment. Since the input to the silicon controlled switch is a positive D.C. voltage pulse, the SCS will remain latched in (conducting) and the indicator lamp will remain illuminated even after the output from the bridge has terminated.

After the machine operator has replenished the depleted toner powder supply, reset switch SW–R is depressed thereby reverse biasing the cathode of the silicon controlled switch by means of the D.C. voltage supply (shown in FIG. 6) and terminating conduction of the silicon controlled switch and extinguishing the indicator lamp NE–2.

The automatic xerographic reproducing machine may continue to operate during the level sensing test and then can again test the quantity of toner powder in the dispenser apparatus at any time by depressing switch SW thereby actuating contacts SW–A and SW–B.

While there has been shown and described what is regarded as a preferred embodiment of the invention, it is obvious that changes in form could be made without departing from the spirit of the invention, and it is intended therefore that the invention be not limited to the exact form shown and described nor to anything less than the whole of the invention as hereinbefore set forth and hereinafter claimed.

What is claimed is:

1. A level sensing apparatus for determining the quantity of material in a container including
   means defining a chamber for retaining a quantity of material therein,
   a variable capacitance electrical charge storage member positioned within said chamber defining means actuable to emit an electrical discharge having an amplitude determined by the quantity of material within the chamber and the position of said variable capacitance electrical charge storage member relative thereto, said variable capacitance electrical charge storage member including a plurality of electrically conductive parallel plates positioned within said means defining a chamber such that the material contained therein reposes between adjacent parallel plates to vary the quantity of electrical charge stored thereby in relationship to the quantity of material reposing therebetween, means operatively connected to said plurality of electrically conductive parallel plates for movement thereof to effect reposing of material therebetween, circuit means including an electrical charge storage element of a predetermined capacitance indicative of a predetermined desired quantity of electrical charge of said variable capacitance electrical charge storage member connected into a bridge circuit with said variable capacitance member to generate a pulse signal therefrom upon a variation in the quantity of electrical charge of said variable capacitance electrical charge storage member from said predetermined quantity, and indicating means coupled to said circuit means to be actuated upon the generation of an electrical charge signal of a predetermined amplitude by said bridge circuit.

2. A toner powder dispenser for use with an automatic xerographic reproducing machine including means defining a chamber for retaining a quantity of xerographic toner powder therein, a dispensing plate positioned to form a discharge outlet for the xerographic toner powder retained in said chamber defining means, means operatively connected to said dispensing plate for actuation thereof to dispense a metered quantity of xerographic toner powder from said chamber defining means, a variable capacitance electrical charge storage member positioned within said chamber defining means actuable to emit an electrical discharge having an amplitude determined by the quantity of material within the chamber and the position of said member relative thereto, said variable capacitance electrical charge storage member comprising a plurality of electrically coupled conductive plates interposed between a plurality of electrically grounded conductive plates, means operatively connected between said dispensing plate and said plurality of electrically conductive plates for movement of said plurality of electrically conductive plates to effect the reposing of material therebetween, circuit means including a bridge circuit having an electrical charge storage element of a predetermined capacitanc balanced with said variable capacitance member to define a threshold level whereby a variation in the quantity of electrical charge of said variable member in relationship to the quantity of electrical charge of said predetermined capacitance electrical charge storage element will generate a pulse signal from said bridge circuit, and indicating means coupled to said circuit means actuable upon the generation from said bridge circuit of a pulse signal having a predetermined amplitude indicative of a depletion of xerographic toner powder from said chamber defining means.

3. A level sensing apparatus for determining the quantity of material comprising members to contain a quantity of material to be sensed, said members constituting a variable capacitance electrical charge storage means actuable to emit an electrical discharge hving an amplitude determined by the quantity of material relative to said members, means operatively connected to at least one of said members for movement thereof to effect reposing of material therebetween, circuit means including an electrical charge storage element of a predetermined capacitance indicative of a predetermined desired quantity of electrical charge of said variable capacitance electrical charge storage means connected into a bridge circuit with said variable capacitance element to generate a pulse signal therefrom upon a variation in the quantity of electrical charge of said variable capacitance electrical charge storage means from said predetermined quantity, and indicating means coupled to said circuit means to be actuated upon the generation of an electrical charge signal of a predetermined amplitude by said bridge circuit.

References Cited

UNITED STATES PATENTS

| | | | |
|---|---|---|---|
| 1,889,663 | 11/1932 | Ilyus | 222—52 X |
| 2,176,562 | 10/1939 | Rose | 222—284 X |
| 2,540,146 | 2/1951 | Stobler | 222—52 X |
| 2,618,395 | 11/1952 | Brabander | 222—56 X |
| 3,149,650 | 9/1964 | Horst | 222—52 X |
| 3,158,291 | 11/1964 | Lytton et al. | 222—39 |

SAMUEL F. COLEMAN, Primary Examiner

H. S. LANE, Assistant Examiner

U.S. Cl. X.R.

222—76, 198